July 11, 1933.  G. P. LUCKEY  1,918,188
ALTIMETER TEMPERATURE CORRECTION COMPUTER
Filed Jan. 14, 1929
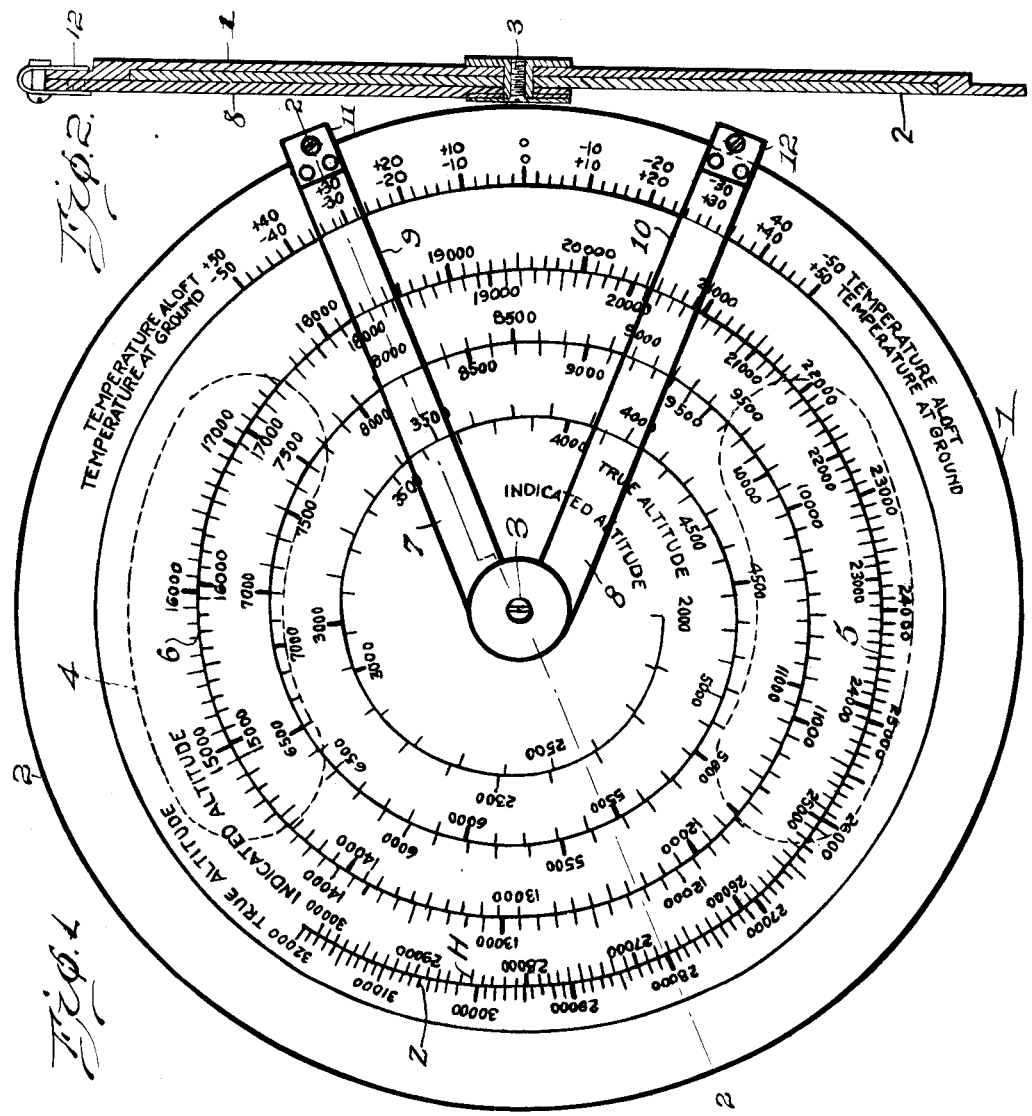
Inventor
George P. Luckey
By Albert H. Young
Atty.

Patented July 11, 1933

1,918,188

UNITED STATES PATENT OFFICE

GEORGE P. LUCKEY, OF LANCASTER, PENNSYLVANIA

ALTIMETER TEMPERATURE CORRECTION COMPUTER

Application filed January 14, 1929. Serial No. 332,509.

The invention relates to aeronautical instruments and in particular to an instrument designed to correct the indicated altitude of aircraft altimeters for the actual air temperature encountered in flight.

It is the present practice to determine the altitude of aircraft in flight by means of an aneroid barometer calibrated to indicate the elevation in feet. An aneroid is actuated solely by the pressure of the air. However, in order to determine the altitude of a point above the earth's surface, the density of the air in the column between that point and the surface of the earth must be taken into consideration. The density depends not only upon the pressure but also on the temperature of the air. Altimeters, therefore, are calibrated to a standard which assumes a uniform decrease in temperature with altitude.

For most purposes, altimeters of this kind are sufficiently accurate, but there is a need frequently for more accurate altitude determination, based upon consideration of the actual temperature conditions on the ground and at the flight altitude, which conditions vary constantly and are inconsistent with the assumption upon which the ordinary altimeter is built.

It is therefore the purpose of the present invention to provide an instrument which may be used conveniently by an aircraft pilot in flight to correct the altimeter indication for existing temperature conditions.

The preferred embodiment of the invention is described in the following specification and illustrated in the annexed drawing in which:

Figure 1 is a plan view of the instrument; and

Figure 2 is a cross-section on line 2—2 of Fig. 1.

Before describing the specific details of an instrument constructed in accordance with the invention, the mathematical development of its principle of operation will be discussed.

As has been stated, altimeters in current use are calibrated to a standard which assumes a uniform decrease of temperature with altitude. The assumption is made that the temperature at any altitude is given by the equation $t = 15 - 0.001981 H$ where $t$ is the temperature in degrees centigrade and $H$ is the height in feet.

At any pressure P given in millimeters of mercury the altitude indicated by the altimeter is given by the formula $$P = 760 \left(1 - \frac{0.001981 H}{288}\right) 5.256$$

For this same pressure if it is assumed that the temperature of the air column is 0° C. the altitude Z is expressed by the formula $$Z = 60374.44 \log \frac{760}{P}$$

where Z is the isothermal altitude in feet.

The true altitude $h$ can be found from the isothermal altitude by multiplying Z by $$\frac{T_m}{T_s}$$

where $T_m$ is the mean temperature of the air column in ° C. absolute and $T_s = 237°$ C. absolute.

$$h = \frac{T_m}{273} 60374.44 \log \frac{760}{P}$$

$$T_m = 273 + t_m$$

where $t_m$ is the mean temperature in degrees C.

$$t_m = \frac{t_1 + t_2 + t_3 + \ldots + t_n}{n}$$

where $t_1, t_2, \ldots t_n$ are the free air temperatures taken at equal intervals of Z or isothermal altitude.

The mean temperature $t_m$ may be approximately determined by the observation of two free air temperatures, the temperature aloft, $t_o$ and the ground temperature, $t_s$. Then approximately $$t_m = \frac{t_o + t_s}{2}$$

This approximate value of $t_m$ is used in designing the computer because too great a burden would be placed upon the pilot if he were required to obtain a series of temperature readings at equal isothermal altitudes.

By making use of this approximate value of $t_m$ it is only necessary to know the temperature on the ground and the free air temperature at the altitude attained.

The true altitude $h$ can then be found by multiplying the Z altitude corresponding to the altitude indicated by the altimeter by $$\frac{273+t_m}{273}$$

or $$h = \left(1+\frac{t_o+t_z}{546}\right) Z$$

In case Z is laid out on a logarithmic scale then the true altitude can be found on the same scale by adding to it the log $$\left(1+\frac{t_o+t_z}{546}\right)$$

$$\log h = \log Z + \log\left(1+\frac{t_o+t_z}{546}\right)$$

The quantity which must be added, $$\log\left(1+\frac{t_o+t_z}{546}\right)$$

will now be given further consideration to get it in simplified form.

$$\text{Log}\left(1+\frac{t_o+t_z}{546}\right)$$

can be expressed in the form of a series $$\log\left(1+\frac{t_o+t_z}{546}\right) = M\left(\frac{t_o+t_z}{546} - \frac{1}{2}\left(\frac{t_o+t_z}{546}\right)^2 + \frac{1}{3}\left(\frac{t_o+t_z}{546}\right)^3 - \ldots\right)$$

where M is the modulus for the common logarithms, i. e.

$$M = \log {}^{10}e = .4342945$$

In case $$\frac{t_o+t_z}{546}$$

is small the terms of higher orders of $$\frac{t_o+t_z}{546}$$

can be neglected and $$\log\left(1+\frac{t_o+t_z}{546}\right)$$

is approximately $$M\left(\frac{t_o+t_z}{546}\right)$$

The error due to this approximation can be decreased for larger values of $(t_o+t_z)$ at the expense of greater errors for smaller values of $(t_o+t_z)$ by multiplying $$M\left(\frac{t_o+t_z}{546}\right)$$

by a constant such that for some intermediate value of $t_o+t_z$ $$\log\left(1+\frac{t_o+t_z}{546}\right) = kM\left(\frac{t_o+t_z}{546}\right)$$

The errors introduced in the determination of the altitude by making this assumption have been worked out but they can be neglected for all practical purposes.

For example if when $t_o+t_z = -40°$ $$\log\left(1+\frac{t_o+t_z}{546}\right) = kM\left(\frac{t_o+t_z}{546}\right)$$

then $k = 1.0385$.

If this value of $k$ is used the error introduced in the computation of the true altitude for different values of the mean temperature or $$\frac{t_o+t_z}{2}$$

is as follows:

| $\frac{t_o+t_z}{2}$ | Per cent error |
|---|---|
| °C. | |
| 15 | .36 |
| 10 | .21 |
| 5 | .09 |
| 0 | .00 |
| −5 | .05 |
| −10 | .07 |
| −15 | .05 |
| −20 | .09 |
| −25 | .09 |
| −30 | .23 |
| −35 | .41 |
| −40 | .65 |

From this it can be seen that the errors introduced in the true altitude for the values of $t_o+t_z$ through the ranges ordinarily used will be less than 10 feet in 10,000 feet.

From this it is apparent that by adding to the logarithmic Z scale $$\frac{kM}{546}t_o + \frac{kM}{546}t_z$$

the true altitude can be read off on the Z scale, or $$\log h = \log Z + \frac{kM}{546}t_o + \frac{kM}{546}t_z$$

If the value of $k$ given above is used $$\log h = \log Z + .00082605 t_o + .00082605 t_z$$

Now assume that $.00082605 t_o$ and $.00082605 t_z$ are laid off on a slide that can be moved relative to the logarithmic Z scale and laid off in such a manner that starting from a zero point positive values of ground temperature $t_z$ and negative values of temperature $t_o$ are drawn to the right and negative values of $t_z$ and positive values of temperature $t_o$ are drawn to the left (Fig. 1) then

```
       t_z
−25 −20 −15 −10 −5  0  +5 +10 +15 +20 +25
 |   |   |   |   |  |   |   |   |   |   |
+25 +20 +15 +10 +5  0  −5 −10 −15 −20 −25
       t_o
``` the distance between any two values of $t_z$ and $t_o$ is equal to $.00082605 (t_o+t_z)$. This value added to the Z altitude corresponding to the altitude indicated by the altimeter will give the true altitude which is read on the Z scale.

Several types of computers can be designed using the principles brought forth above. It is believed, however, that the best type for service use is a circular computer such as that disclosed in the accompanying drawing.

The numerals 1 and 2 designate two concentric members which are adjustable relatively upon the pivot 3 of any suitable construction. It has been found expedient to make the members 1 and 2 in the form of flat circular plates, the former being larger in diameter than the latter and recessed in such a manner that the smaller member 2 fits within the recess for rotation therein with one circular face substantially flush with the corresponding annular face of the larger member 1. To facilitate manipulation of the member 2, finger slots 4 are provided in the member 1 as shown in dotted lines in Figure 1.

A double scale of altitudes in the form of a spiral curve 5 is delineated upon the exposed face of member 2. Along this curve the proposed "Z" scale of isothermal altitude is laid out logarithmically with respect to degrees. The "H" scale of indicated altitude is also laid out along the same curve 5 coextensive with the "Z" scale in such manner that values of H and Z for corresponding pressures are adjacent. The true altitude scale is called the "Z" scale and the indicated altitude scale is called the "H" scale. These two scales are used to obtain the isothermal altitude value of the pressure corresponding to the pressure actuating the altimeter. The altitude as indicated by the altimeter instrument is read off on the H scale and the number on the Z-scale represents the isothermal altitude corresponding to the pressure at the indicated altitude. Thus, if H is equal to 10,000 ft., Z is equal to 9,821 ft.

In the illustrative embodiment of the invention, the low altitudes are placed in the center of the spiral. This aids in obtaining a constant error throughout the range as the higher altitude readings, which are cramped because of the logarithmic scale, are opened out because of the greater linear distance subtended by one degree on the outer portion of the scale. A small sized computer can be made yet the scale can be made long enough to read the true altitude within the accuracy of the computer or $\frac{1}{10}\%$.

A double scale of temperatures 6 is delineated on the front face of member 1 and extends circumferentially with respect to member 2. This scale is calibrated in degrees centigrade, for the purpose of illustration, and is laid off in such a manner that, starting from a zero point, positive values of ground temperature $t_z$ and negative values of temperature aloft $t_o$ are drawn to the right. Negative values of $t_z$ and positive values of $t_o$ are drawn to the left. The distance between any two values of $t_z$ and $t_o$ is equal to $.00082605(t_o+t_z)$. If the average temperature of the outer scale 6, represented by the value $.00082605(t_o+t_z)$ is added to or subtracted from the isothermal altitude represented by the number on the Z-scale opposite the altimeter reading of the H-scale, then the true altitude can be read on the Z-scale. The true altitude indication found on the Z-scale will be more than the isothermal altitude if the average of the two temperatures is positive. It will be the same if the average is zero, and will be less if the average is negative.

Since it has been developed that this value, $.00082605(t_o+t_z)$, added to the isothermal altitude Z corresponding to the altitude H indicated by the altimeter, will give the true altitude $h$ which is read on the Z scale, it is desirable to provide means for aiding the eye in the registration of selected points on the altitude scale with points on the temperature scale. This may be accomplished by pivoting arms 7 and 8 concentric to the axis of member 2. These arms should traverse both the altitude and the temperature scales, and should have straight edges 9 and 10 respectively extending precisely radial to pivot 3. For convenience in the operation of the computer, arms 7 and 8 are provided with suitable clamps 11 and 12 which may be tightened sufficiently to afford such frictional contact between the arms and member 1 that the arms will remain in adjusted position until forcibly moved. The arms may be constructed of any suitable material but it is desirable to use a transparent material, such as celluloid, in order that the graduations on the scales may not be obscured.

The operation of the computer will now be described. Before going into the air, the ground temperature must be determined. Then, at any altitude indicated by the altimeter the temperature must be taken by use of a thermometer. By using one of the radial arms, the temperature aloft $t_o$ on scale 6 is placed opposite the altimeter indication (and the Z altitude corresponding to the same pressure) on scale 5. This is accomplished most readily by setting the straight edge 9 of arm 7 at the proper $t_o$ graduation and then rotating member 2 with respect to member 1 until the straight-edge is in registration with the proper indicated altitude graduation. Next, the straight-edge 10 of arm 8 is placed in registration with the proper $t_z$ graduation. Where this straight-edge crosses the Z scale on member 2, the true altitude corrected for temperature variations may be read. Thus, if the altimeter indication, as read on the H-scale is 23,290 ft., then the isothermal altitude corresponding to this pressure, as read on the Z-scale, would be 24,050 ft. Now, if it be supposed that the right hand index 10 is on a ground temperature of plus 24 degrees and the left hand index 9 is on a temperature aloft of plus 18 degrees, then the average is positive so that the true altitude on the Z-scale will be more than the isothermal altitude (24,050 ft.). From this it will be seen that the temperature aloft indication must be placed opposite the altimeter reading (23,290 ft.) and the true altitude or the isothermal altitude corrected for temperature would be 26,040 ft., as read off on the Z-scale opposite the right hand index 10.

In case it is desired to fly at a certain true altitude, as in photographic mapping missions, the problem can be solved most easily by mentally reversing the $t_z$ and $t_o$ scales, calling $t_z$ the ground temperature $t_o$ the temperature aloft. The ground temperature on the $t_z$ scale is then set opposite the true altitude desired on the Z scale and, when the altimeter indication is opposite the flight altitude temperature, the aircraft is at the desired true altitude.

Confusion can be avoided in using the temperature scale in case it is remembered that if $t_o + t_z$ is less than 0° C., or negative, the true altitude will be less than the Z altitude corresponding to the H or indicated altitude. If $t_o + t_z$ is more than 0° C., or positive, the true altitude will be greater than the Z altitude corresponding to the H altitude.

In case the altimeter has been calibrated to a standard, other than that given in this specification by way of example, a computer can be made in the same manner by drawing in opposite the values of altitude on the Z scale the altimeter indications corresponding to the same pressure.

The values of Z corresponding to given values in H used in this computer are computed from the formula $$Z = 60374.44 \log \frac{P_o}{P}$$

$$\frac{P}{P_o} = \left(\frac{1 - 0.001981H}{288}\right) 5.256$$

where the values $$\frac{P_o}{P}$$

are taken for values of H for each 100 feet from N. A. C. A. Report No. 218—Standard Atmosphere Tables and Data. The computation of the H and Z scales is as follows: One hundred foot increments of "New Standard" altitude from 2000 to 32000 ft. are taken for the H scale and the corresponding value of $$\frac{P}{P_o}$$

determined from the tables in N. A. C. A. Report No. 218. The log of $$\frac{P}{P_o}$$

is next obtained and from this the value of the logarithm of $$\frac{P_o}{P}$$

This value multiplied by the constant 60374.44 gives the value of isothermal altitude corresponding to the new standard altitude. Values of isothermal altitude from 2000 to 32000 feet are plotted logarithmically along a spiral as shown in the drawing. The number of turns of the spiral for a scale of suitable length was found by using the formula:

Angle in degrees—1000 (log Z—log 2000)

The new standard altitude is then laid out with reference to the isothermal scale.

Various other obvious modifications may be made in practice without departing from the basic principle of the invention. Substitution of materials, changes in form, and other means of representing the logarithmic values of altitude, and such other expedients as are within the scope of the present disclosure may be resorted to in the practical development of the inventive idea. For instance, one of the radial arms could be omitted and the remaining arm could be used in two successive adjustments to cause initial registration of the Z scale and $t_o$ scale and then to read back from the $t_z$ scale to the Z scale. Even omission of both arms would not render the device inoperative, because some separate straight-edge could be used.

What I claim and desire to secure by Letters Patent is:

1. A device of the class described comprising a member bearing a scale of altitudes arranged in a spiral curve and graduated logarithmically with respect to degrees around the point of origin of the curve, a second member pivoted to the first member concentrically with respect to the point of origin of the spiral curve and bearing an arcuate scale of temperatures concentric to the pivot and calibrated in degrees proportional to the mean temperature of the air in flight, said members being relatively movable for causing radial registration of selected points on the respective altitude and temperature scales, and radial index means for facilitating the registration of the selected points.

2. A device of the class described comprising a member bearing a scale of isothermal altitudes and an altimeter indication scale arranged in a spiral curve with values on both scales for corresponding pressures adjacent, the scale of isothermal altitudes being laid off logarithmically with respect to degrees around its point of origin and a second member pivoted concentric to the point of origin of the spiral curve of the first member and bearing arcuate ground temperature and flight altitude temperature scales arranged concentric to the pivot, the temperature scales having a common zero point and positive and negative graduations extending on opposite sides of the zero point and reversed for both scales, the distance between any two values of ground and flight altitude temperatures on the scales being equal to .00082605 times the sum of the two temperature values.

3. A device of the class described comprising a member bearing a scale of isothermal altitudes and an altimeter indication scale arranged in a spiral curve with values on both scales for corresponding pressures adjacent, the scale of isothermal altitudes being laid off logarithmically with respect to degrees around its point of origin, a second member pivoted concentric to the point of origin of the spiral curve of the first member and bearing arcuate ground temperature and flight altitude temperature scales arranged concentric to the pivot, the temperature scales having a common zero point and positive and negative graduations extending on opposite sides of the zero point and reversed for both scales, the distance between any two values of ground and flight altitude temperatures on the scales being equal to .00082605 times the sum of the two temperature values, said members being relatively movable for causing radial registration of selected points on the respective altitude and temperature scales, and radial index means for facilitating the registration of the selected points.

4. A device of the class described comprising a member bearing a scale of isothermal altitudes and an altimeter indication scale arranged in a spiral curve with values on both scales for corresponding pressures adjacent, the scale of isothermal altitudes being laid off logarithmically with respect to degrees around its point of origin, a second member pivoted concentric to the point of origin of the spiral curve of the first member and bearing arcuate ground temperature and flight altitude temperature scales arranged concentric to the pivot, the temperature scales having a common zero point and positive and negative graduations extending on opposite sides of the zero point and reversed for both scales, the distance between any two values of ground and flight altitude temperatures on the scales being equal to .00082605 times the sum of the two temperature values, and a pair of relatively movable arms pivoted concentric to the scale-bearing members and having radial lines traversing the various scales.

5. A device of the class described comprising a pair of relatively pivoted members, one member bearing a scale of measurement having its subdivisions numbered consecutively from a point of origin and being laid off logarithmically with respect to degrees on a spiral curve originating at the pivotal axis of the two members, the other member having a linear scale of measurement laid off on an arc concentric to the pivotal axis, both members being relatively adjustable to permit radial registration of selected graduations on both scales, the mathematical relationship of the subdivisions and graduations of both scales being such that addition to, and subtraction from, any selected graduation on the logarithmic scale of the angular measurement subtended by a selected distance on the linear scale will produce multiplication and division respectively of that graduation by the mean of the graduations on the linear scale marking the limits of the selected distance.

6. A device of the class described comprising a pair of relatively pivoted members, one member bearing a scale of measurement having its subdivisions numbered consecutively from a point of origin and being laid off logarithmically with respect to degrees on a spiral curve originating at the pivotal axis of the two members, the other member having a linear scale of measurement laid off on an arc concentric to the pivotal axis, both members being relatively adjustable to permit radial registration of selected graduations on both scales, the mathematical relationship of the subdivisions and graduations of both scales being such that addition to, and subtraction from, any selected graduation on the logarithmic scale of the angular measurement subtended by a selected distance on the linear scale will produce multiplication and division respectively of that graduation by the mean of the graduations on the linear scale marking the limits of the selected distance, said members being relatively movable for causing radial registration of selected points on both scales and radial index means for facilitating the registration of the selected points.

7. An altimeter temperature correction computer including an altitude scale having a series of indicated altitude graduations corresponding to the calibrations of the altimeter and a series of isothermal altitude graduations laid out relative to the first series so that values of indicated altitudes and isothermal altitudes for corresponding pressures are adjacent, a temperature scale having positive and negative values of ground temperatures and temperatures aloft, and means coacting with the said scales for indicating the isothermal altitude graduation corresponding to the true altitude for a mean temperature.

In testimony whereof I affix my signature.

GEORGE P. LUCKEY.